C. C. Walworth.
Making Gas and Water Fittings.
No. 16,663.  Patented Feb. 17, 1857.
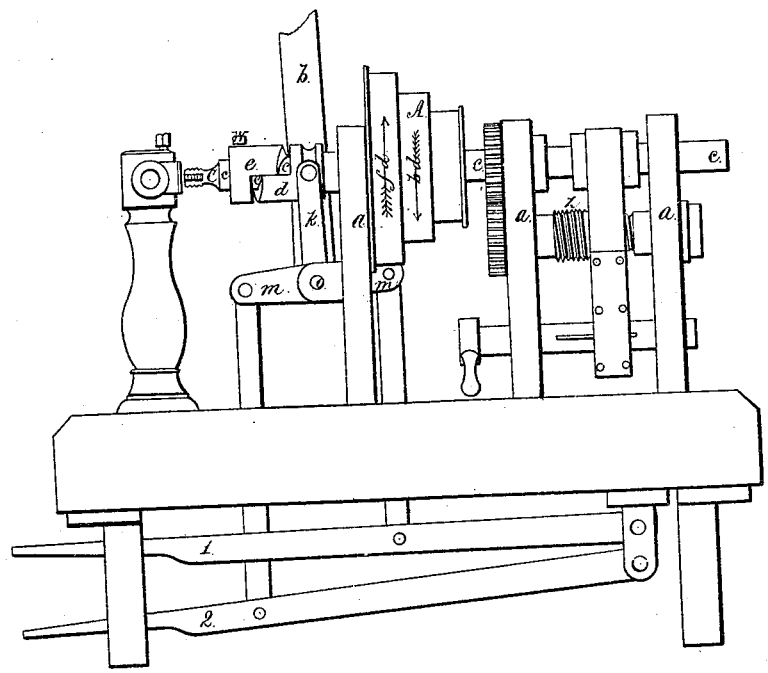
Fig. 1.
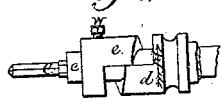  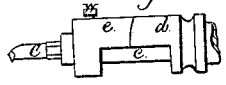 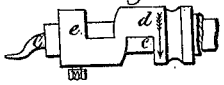
Fig. 2.  Fig. 3.  Fig. 4.  Fig. 5.
   
Fig. 6.  Fig. 7.
Witnesses:
P. E. Tschemacher
J. B. Crosby
Inventor:
C. C. Walworth

UNITED STATES PATENT OFFICE.

CALEB C. WALWORTH, OF BOSTON, MASSACHUSETTS.

MACHINE FOR FITTING GAS-PIPES.

Specification of Letters Patent No. 16,663, dated February 17, 1857.

*To all whom it may concern:*

Be it known that I, CALEB C. WALWORTH, of the city of Boston, in the county of Suffolk and State of Massachusetts, have invented certain new and useful Improvements in Machines for Turning and Screwing, Reaming, Boring, and Tapping Pipe-Fittings; and I do hereby declare that the following is a full, clear, and exact description of the same, reference being had to the accompanying drawings, forming a part of this specification, and to the characters of reference marked thereon.

The nature of my invention relates to the arrangement and construction of those parts of a machine by which its rotary traversing, cutting, tool is rotated in either direction and its amount of advance governed, and consists in a coupling of peculiar construction operating automatically to govern the extent of the advance of the cutting tool and to reverse its direction of rotation, and in the combination of a coupling with a rotating traversing mandrel to which a cutting tool is fixed in such a manner that the advance of the mandrel shall unlock the coupling at the point determined upon by the adjustment of the driven part of the coupling upon the mandrel.

To enable others skilled in the art to make and use my invention I will describe its construction and operation.

Figure 1, is an elevation exhibiting these improvements as applied to a machine for operating on pipe fittings invented by me and patented Oct. 7th, 1856 and numbered 15860 and represents the coupling fully locked or adjusted to give the greatest amount of traverse allowed by its construction. Fig. 2, is a detail of the coupling adjusted to give a less amount of traverse to the cutting tool C, than in Fig. 1. Fig. 3, shows the coupling at the point of unlocking. Fig. 4, shows the coupling in the position where the direction of rotation of the driving port $d$, of the coupling is changed to that indicated by $b$ $a$. Fig. 5 shows the part $d$ of the coupling rotating in the direction $b$ $a$ with its long face in contact with the long face of the part $e$ which part is rotated by the contact. Fig. 6, shows the coupling constructed as in Fig. 1 with the addition of the ring $x$, fixed on the driving part $d$ of the coupling and overhanging it to such an extent as to embrace a portion of the driven part $e$ in any position required in its action. Fig. 7 shows the operation of the common coupling in its new combination.

In the driven part $e$ of the coupling a feather is fixed fitting in a spline cut in the mandrel which is rotated by it. It is adjusted longitudinally on the mandrel by the set screw $w$. The driving part $d$ of the coupling extends through the framing $a$ and the pulley A is fixed thereon. Both parts of the coupling have acting faces which are complex; two faces of each part are in axial planes (planes cutting the axis of the coupling longitudinally) and are of different lengths joined by a face crossing such planes at an angle inclined to them as shown by the drawings. The rock shaft $o$, supported in suitable bearings attached to the frame $a$ has fixed upon it the forked arm $k$ the shipper $b$ and the arm $m$. The arm $k$ being connected to the part $d$ of the coupling, receives motion from it which is communicated to the rock shaft $o$ and consequently to the shipper $b$ and arm $m$. The shipper acts in any suitable and well known driving and reversing gear such as is used for screw cutting lathes and from which motion is communicated to the pulleys in either direction indicated by the arrows $b$ $a$ and $f$ $a$.

The mandrel $c$ when rotated by the pulley in the direction indicated by $f$ $a$ through the connection and intervention of the coupling advances by the action of the feeding screw $x$ until the short faces of the coupling have become disengaged as seen in Fig. 3, by the advance of the mandrel carrying the driven part $e$ of the coupling, when the mandrel being no longer rotated and being held from farther advance by the contact of the tool with the work, and the driving part $d$ of the coupling continuing to revolve as before the rotary action of the inclined face of the part $d$ against the inclined face of the now stationary part $e$ moves the part $d$ of the coupling back from the work to about the position shown in Fig. 4, consequently moving the forked arm $k$ the shipper $b$ and all the other parts connected therewith. This movement of the shipper acting on the driving and reversing gear before mentioned reverses the direction of the rotation of the pulley to that indicated by $b$ $a$ and the part $d$ of the coupling rotating in that direction brings the long faces of both parts of the coupling in contact as shown in Fig. 5, thus rotating the mandrel in the opposite direction from that first given it consequently reversing the motion of the feeding screw and withdrawing the tool from the work.

It is obvious that when the cutting tools used are screw taps or dies or portions thereof any feed that suffices to bring them hard against the work will answer as such tools after they have once caught in their work will when properly rotated feed of themselves and when the direction of rotation is changed will disengage themselves from the work. The amount of lap of the short faces of the couplings determines with exactness the amount of the advance and is varied by adjusting the driven part *e* of the coupling on the mandrel. When only turning or boring tools or reams are to be used which do not require rotation to be withdrawn from their work as do tools that are used for cutting screw threads, a coupling constructed as shown in Fig. 7 with its faces in axial planes of a length joined by faces square to such planes can be used to rotate the cutting tool in its advance, and govern the amount of the advance by the amount of the lap of its axial faces. The pulley could be made to rotate as indicated by *f a*, reversed or stopped by the operative by means of the levers 1 and 2, which operate upon the shipper in a perfectly obvious manner and the tool could be fed to and from its work by a common lever feed.

I claim—

The coupling constructed, with long, short and inclined faces, substantially as described, and operating for the purposes set forth.

C. C. WALWORTH.

Witnesses:
P. E. TESCHEMACHER,
J. B. CROSBY.